Patented Apr. 22, 1924.

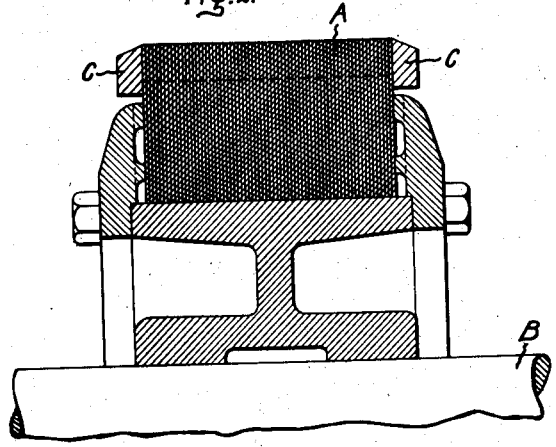
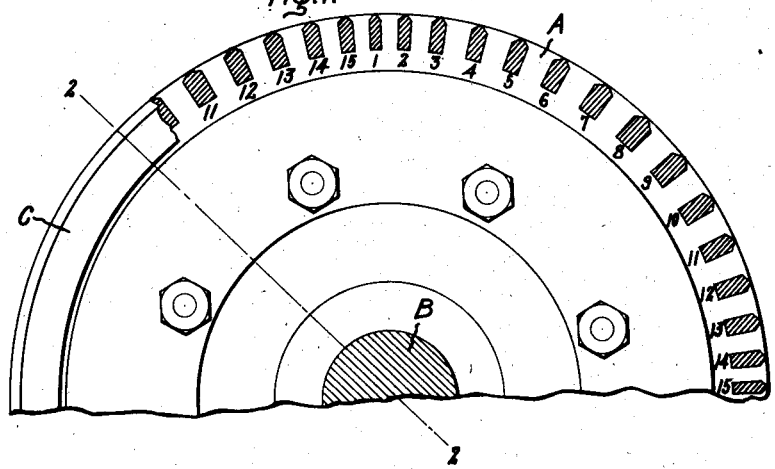

1,491,375

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

INDUCTION MOTOR.

Application filed May 28, 1923. Serial No. 641,837.

*To all whom it may concern:*

Be it known that I, SVEN R. BERGMAN, a subject of the King of Sweden, residing at Nahant, in the county of Essex, State of Massachusetts, have invented certain new and useful Improvements in Induction Motors, of which the following is a specification.

My invention relates to induction motors and particularly to the secondary members of such motors. It is well known that one of the difficulties met with in the operation of induction motors having secondary members provided with squirrel cage windings is the loss of torque or "dead" points at starting and at sub-synchronous speeds. This difficulty has been overcome heretofore by the choice of the best possible ratio between the number of slots in primary and secondary members. This has not always solved the difficulty, however, as it has been found that frequently with the best ratio of slots there has occurred a loss of torque at sub-synchronous speeds in certain induction motors. In accordance with my invention, I have solved this difficulty in a new and novel way, which consists in an unequal spacing of the slots in the secondary member of the motor.

Other features of novelty which characterize my invention will be pointed out with particularly in the claims annexed to and forming a part of this specification. For a better understanding of my invention, however, reference may be had to the following description taken in accordance with the accompanying drawing in which Fig. 1 is an end view of the secondary member of an induction motor embodying my invention, with parts broken away, and Fig. 2 is a cross-sectional view of the secondary member of Fig. 1 taken on the line 2—2.

In the drawing, there is shown the secondary member of an induction motor, which I have illustrated as a rotor. It comprises laminations A mounted in the usual manner on a shaft B. The laminations are provided with slots arranged in groups, the slots in one group being numbered from 1 to 8 and in the next adjacent group 9 to 15, the slots of each group being unequally spaced apart. The slots are provided with conductors connected together by usual end rings C to form a short circuited or squirrel cage winding. It will be noted from the drawing that the spacings between adjacent slots in the group numbered 1 to 8, gradually increase, so that the spacing between slots 1 and 2 is a minimum and the spacing between slots 7 and 8 is a maximum, and the spacing between adjacent slots in the adjacent group, numbered 9 to 15, gradually decrease again to a minimum, so that the spacing between slots 14 and 15 is substantially the same as the spacing between slots 1 and 2.

In order to obtain the best operating characteristics with a winding disposed in slots in accordance with my invention, I make the cross-sectional area of the slots and the conductors in the slots, which are spaced far apart, greater than the cross-sectional area of the slots and the conductors in the slots, which are spaced close together. The cross-sectional area of the conductors gradually increases from a minimum in slot 1 to a maximum in slot 8, and then gradually decreases again to a minimum in slot 15. The reason for this change in cross-section is to cause the current to distribute evenly over the whole secondary winding, that is, equally around the periphery of the secondary member when the machine is operating under full load conditions.

In the drawing, I have shown the group of conductors from 1 to 15 equal to a pole pitch, and in the motor shown there are four such groups. This is an advantageous arrangement and will insure balanced conditions in the motor. It is, however, not necessary, and the groups of unequally spaced slots may be less or even greater than a pole pitch. I have shown the secondary member as the rotor of an induction motor, as such secondary members are usually rotors, but my invention is equally applicable to secondary members when used as stators of induction motors.

I desire it to be understood that I aim in the appended claims to cover all such modifications and any others which do not depart from the spirit and scope of my invention.

What I claim as new and desire to secure by Letters Patent of the United States, is:—

1. In an induction motor, a secondary member comprising laminations provided with slots, said slots being arranged in groups, the slots of each group being unequally spaced apart, and conductors in said slots connected together to form a squirrel cage winding.

2. In an induction motor, a secondary member comprising laminations provided with slots, said slots being arranged in groups, the slots of each group being unequally spaced apart, the spacing between adjacent slots in one group gradually increasing to a maximum and the spacing between adjacent slots in the adjacent group decreasing to a minimum, and conductors in said slots connected together to form a squirrel cage winding.

3. In an induction motor, a secondary member comprising laminations provided with slots, said slots being arranged in groups, the slots of each group being unequally spaced apart, and conductors in said slots connected together to form a squirrel cage winding, the cross-sectional area of the conductors in the slots spaced far apart being greater than the cross-sectional area of the conductors in the slots spaced close together.

4. In an induction motor, a secondary member comprising laminations provided with slots, said slots being arranged in groups, the slots of each group being unequally spaced apart, the spacing between adjacent slots in one group gradually increasing to a maximum and the spacing between adjacent slots in the adjacent group, decreasing to a minimum, and conductors in said slots connected together to form a squirrel cage winding, the cross-sectional area of the conductors in the slots in one group gradually increasing to a maximum and the cross-sectional area of the conductors in the slots of the adjacent group decreasing to a minimum, the cross-sectional area of the conductors in the slots spaced far apart being greater than the cross-sectional area of the conductors in the slots spaced close together.

In witness whereof, I have hereunto set my hand this 25th day of May, 1923.

SVEN R. BERGMAN.